(12) United States Patent
Kawabata et al.

(10) Patent No.: US 8,848,216 B2
(45) Date of Patent: Sep. 30, 2014

(54) IMAGE COMMUNICATION APPARATUS WITH TRANSMISSION CONTROL

(75) Inventors: Hirotaka Kawabata, Saitama (JP); Hitoshi Tamura, Saitama (JP); Hideki Fujii, Saitama (JP); Isao Tanaka, Saitama (JP); Minoru Yoshida, Saitama (JP); Satoshi Watanabe, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 720 days.

(21) Appl. No.: 12/768,162

(22) Filed: Apr. 27, 2010

(65) Prior Publication Data

US 2011/0102855 A1    May 5, 2011

(30) Foreign Application Priority Data

Nov. 4, 2009   (JP) ................................. 2009-252988

(51) Int. Cl.
*G06F 3/12*      (2006.01)
*H04N 1/333*     (2006.01)
*H04N 1/32*      (2006.01)
*H04N 1/00*      (2006.01)
*H04N 1/327*     (2006.01)
*H04M 11/06*     (2006.01)

(52) U.S. Cl.
CPC .. *H04N 1/00214* (2013.01); *H04N 2201/33342* (2013.01); *H04N 2201/002* (2013.01); *H04N 1/33376* (2013.01); *H04N 1/32058* (2013.01); *H04N 1/32037* (2013.01); *H04N 1/0022* (2013.01); *H04N 1/33338* (2013.01); *H04N 1/3209* (2013.01); *H04N 1/33369* (2013.01); *H04N 1/32797* (2013.01); *H04M 11/066* (2013.01); *H04N 1/33323* (2013.01); *H04N 1/33361* (2013.01); *H04N 2201/0093* (2013.01)
USPC .......... 358/1.15; 358/436; 358/438; 709/202; 709/232; 709/228

(58) Field of Classification Search
CPC ...... H04B 10/50; H04B 10/564; H04B 10/60; H04B 7/005; H04N 1/00206; H04N 1/00209; H04N 1/00214

USPC ......... 358/1.15, 434, 436, 438; 709/202, 232, 709/228
See application file for complete search history.

(56) References Cited

U.S. PATENT DOCUMENTS

| | | | | |
|---|---|---|---|---|
| 4,931,988 A | * | 6/1990 | Takahashi | ...................... 379/401 |
| 5,159,465 A | * | 10/1992 | Maemura et al. | ............. 358/405 |
| 6,314,170 B1 | * | 11/2001 | Noguchi et al. | ........... 379/93.32 |
| 6,504,919 B1 | * | 1/2003 | Takagi et al. | ............ 379/100.17 |
| 2007/0247670 A1 | * | 10/2007 | Tomita et al. | ................. 358/440 |
| 2009/0304047 A1 | * | 12/2009 | Hulbert et al. | ................ 375/144 |

FOREIGN PATENT DOCUMENTS

| | | |
|---|---|---|
| JP | A-07-226818 | 8/1995 |
| JP | A-11-122452 | 4/1999 |
| JP | A-11-289444 | 10/1999 |
| JP | A-2000-050033 | 2/2000 |

OTHER PUBLICATIONS

May 14, 2013 Notification of Reason for Refusal issued in Japanese Application No. 2009-252988 with English-language translation.

* cited by examiner

*Primary Examiner* — Jamares Q Washington
(74) *Attorney, Agent, or Firm* — Oliff PLC

(57) ABSTRACT

A modem transmission level and modem sensitivity which are communication control information corresponding to the connection form of each destination device are registered in advance in a destination information storage unit so as to be correlated with an abbreviated dialing number of the destination. When a communication instruction using an abbreviated dialing number is received, if a modem transmission level and modem sensitivity are registered in the destination information storage unit as corresponding to the received abbreviated dialing number, the modem is controlled based on those registered modem transmission level and modem sensitivity. If neither a modem transmission level or modem sensitivity is registered as corresponding to the received abbreviated dialing number, the modem is controlled according to a modem transmission level and modem sensitivity that are registered in advance in the apparatus.

3 Claims, 4 Drawing Sheets

FIG. 2

| ABBREVIATED DIALING NUMBER | MODEM TRANSMISSION LEVEL | MODEM SENSITIVITY |
|---|---|---|
| 001 | La | Ga |
| 002 | Lb | Gb |
| 003 | Bb | Gb |
| 004 | La | Ga |
| ⋮ | ⋮ | ⋮ |

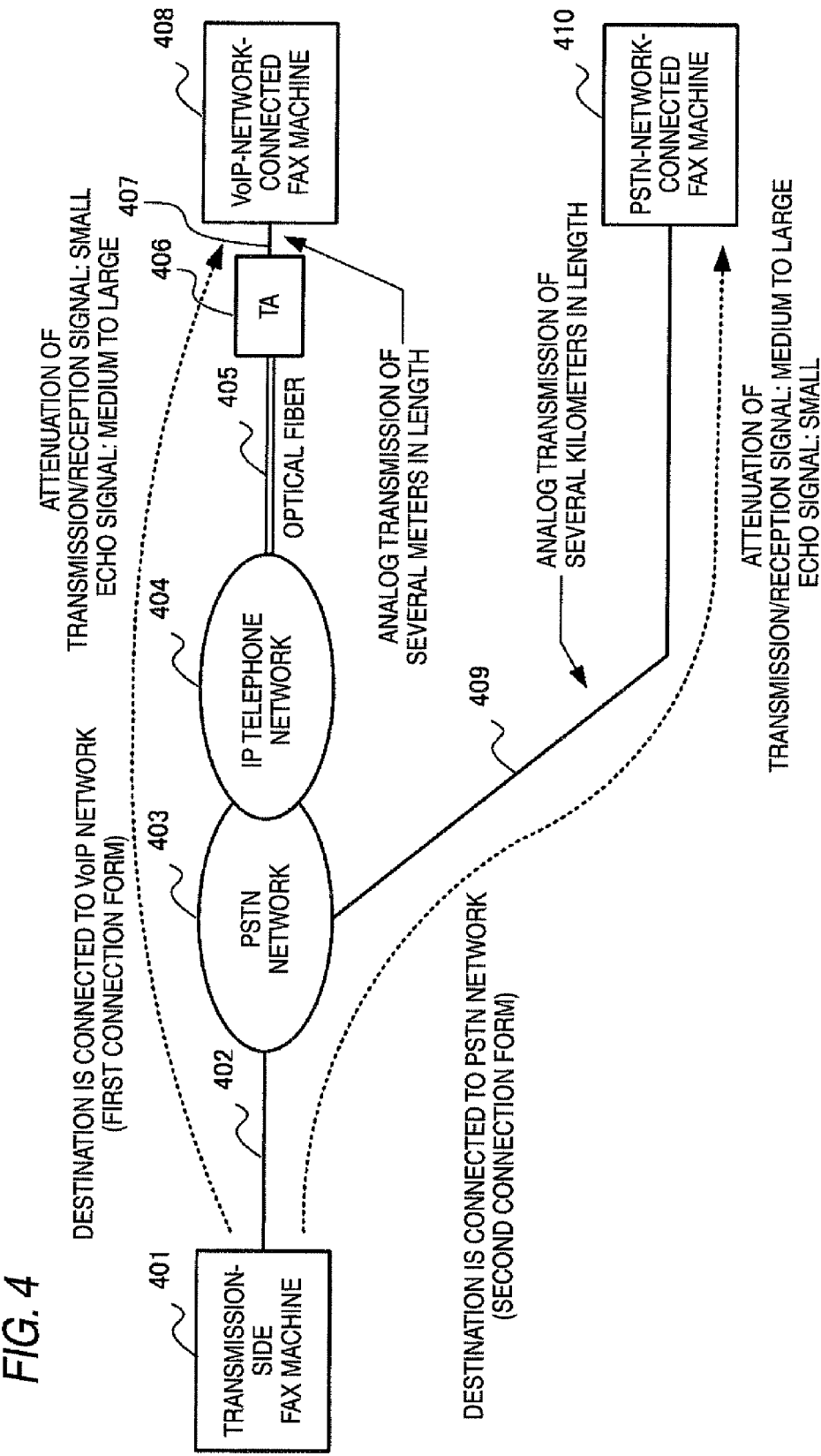

IMAGE COMMUNICATION APPARATUS WITH TRANSMISSION CONTROL

CROSS-REFERENCE TO RELATED APPLICATION

This application is based on and claims priority under 35 USC119 from Japanese Patent Application No. 2009-252988 filed on Nov. 4, 2009.

BACKGROUND

1. Technical Field

The present invention relates to an image communication apparatus.

2. Related Art

In conventional image communication apparatus such as facsimile machines, signals are sent and received according to a signal transmission level and a minimum signal reception level that are set in each apparatus in advance.

IP (Internet protocol) telephone services using the FTTH (fiber to the home) etc. which use an optical fiber as a communication medium have been spreading rapidly. In such IP telephone services, class-A-quality services in which OAB-J telephone numbers are assigned can accommodate facsimile communication.

SUMMARY

According to an aspect of the invention, an image communication apparatus includes a transmission control unit, a network control unit, a transmission/reception control unit, a registering unit, a judging unit and a communication control unit. The transmission control unit controls an image information communication with a destination device which is another image communication apparatus based on an image information communication protocol. The network control unit controls a network connection for a public network. The transmission/reception control unit controls signal transmission and reception of the image information communication based on the image information communication controlled by the transmission control unit and the network connection controlled by the network control unit. The registering unit registers pieces of communication control information with the transmission/reception control unit. The pieces of communication control information correspond to the destination device. The judging unit judges, when a communication instruction with respect to the destination device is received, whether the pieces of communication control information are registered with the registering unit as corresponding to the destination device. The communication control unit controls the transmission/reception control unit based on the pieces of communication control information if the judging unit judges that the pieces of communication control information are registered with the registering unit as corresponding to the destination device.

BRIEF DESCRIPTION OF THE DRAWINGS

Exemplary embodiments of the invention will be described in detail based on the following figures, wherein:

FIG. 2 shows example pieces of destination information stored in a destination information storage unit shown in FIG. 1;

FIG. 4 illustrates problems of the prior art.

DETAILED DESCRIPTION

An embodiment of the present invention will be hereinafter described in detail with reference to the accompanying drawings.

Figure 1:
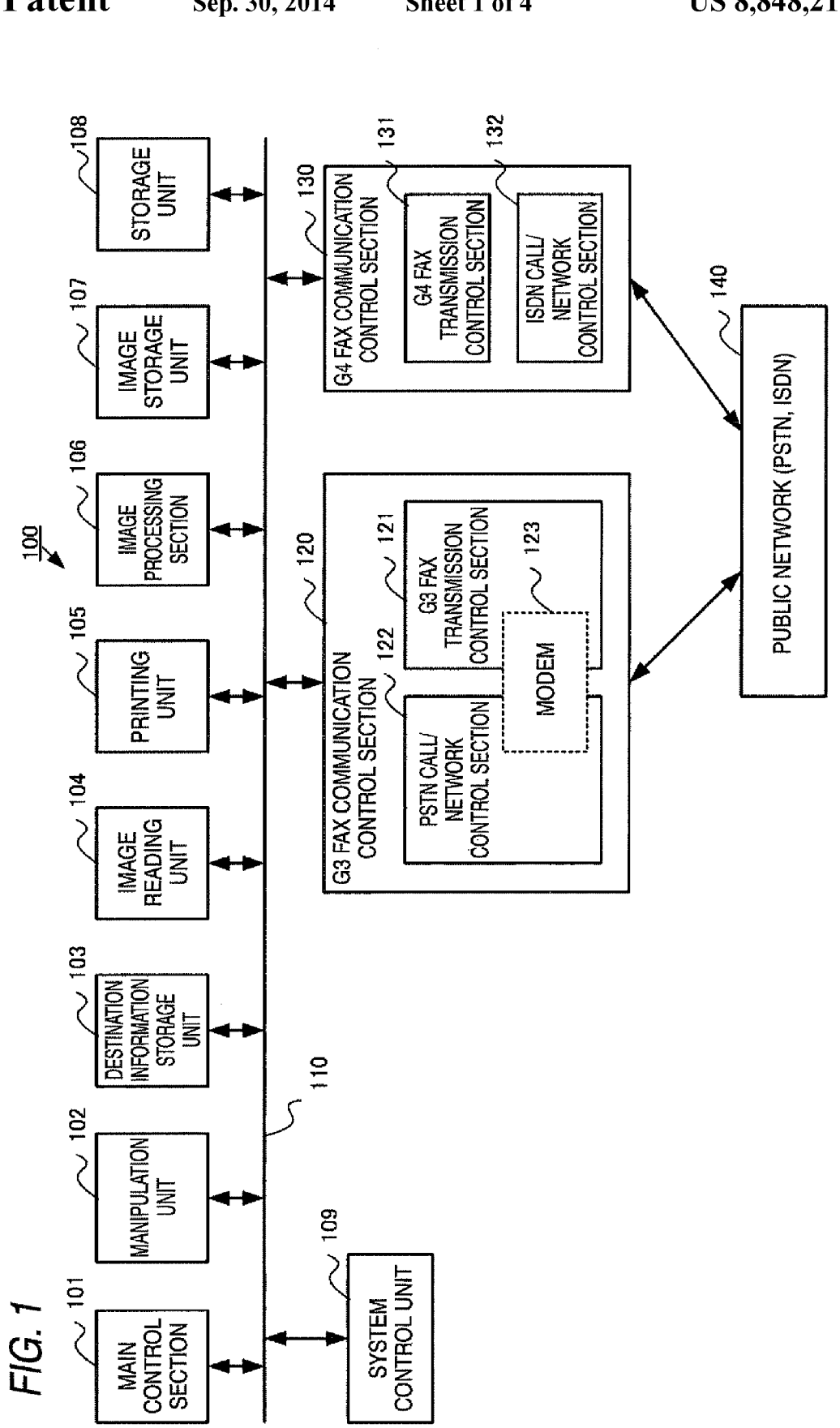
FIG. 1 is a block diagram showing a general configuration of an image communication apparatus according to an embodiment of the present invention.

FIG. 1 is a block diagram showing a general configuration of an image communication apparatus according to the embodiment of the invention. The image communication apparatus 100 is configured in such a manner that a main control section 101, a manipulation unit 102, a destination information storage unit 103, an image reading unit 104, a printing unit 105, an image processing unit 106, an image storage unit 107, a storage unit 108, a system control section 109, a G3 fax communication control section 120, and a G4 fax communication control section 130 are connected to a bus 110.

The main control section 101 controls image processing that is performed in the image communication apparatus 100.

The manipulation unit 102 is equipped with various manipulation keys for manipulation of the communication apparatus 100 and a display unit for displaying various kinds of information.

The destination information storage unit 103 is stored with pieces of destination information such as abbreviated dialing numbers of destination devices and pieces of communication control information corresponding to abilities of the destination devices.

The image reading unit 104 reads a document image at a prescribed resolution, and the printing unit 105 prints an image at a prescribed resolution.

The image processing unit 106 performs such processing as coding, decoding, enlargement, and reduction on image data.

The image storage unit 107 stores an image read by the image reading unit 103 or a received image.

The system control section 109 is an example of a judging unit, and performs overall control processing of the image communication apparatus 100. At least the system control section 109 is executed by a processor of the image communication apparatus 100.

The G3 fax communication control section 120 is composed of a G3 fax transmission control section 121, a PSTN (public switching telephone networks) call/network control section 122, and a modem 123. The G3 fax transmission control section 121 controls an image information communication based on a facsimile protocol (an image communication protocol) according to the ITU-T Recommendation T.30 procedure. The PSTN call/network control section 122 establishes a call through an analog public network (PSTN network) and controls a network connection. The modem 123 sends/receives a signal over a public network (PSTN or ISDN) 140.

The G4 fax communication control section 130 is composed of a G4 fax transmission control section 131 and an ISDN call/network control section 132. The G4 fax transmission control section 131 controls an image information communication based on a G4 facsimile protocol (an image communication protocol). The ISDN call/network control section 132 establishes a call through a digital public network (ISDN network), controls a network connection, and sends/receives a signal over the public network (PETN or ISDN) 140.

Incidentally, there is differences in the characteristics of a signal that is transmitted or received during a facsimile communication between the conventional PSTN connection form using an analog signal in which an accommodating station (exchange) that accommodates a terminal establishes a connection to another terminal through a transmission path that is as long as several kilometers and a form in which a signal is transmitted digitally from an accommodating station and a connection is made to another terminal from a VoIP (voice over Internet protocol) terminal adapter or a home gateway through a transmission path of several meters in length.

More specifically, as the transmission path of an analog signal becomes longer, the signal attenuates more and a frequency characteristic that the attenuation amount becomes larger as the frequency increases becomes more remarkable.

As a result, where a terminal is connected to a VoIP terminal adapter or the like having a short analog transmission path in an environment that assumes analog signal transmission of several kilometers, trouble may occur that the level of a signal reaching a partner terminal is too high or the terminal picks up an echo signal returned from around a partner terminal if the former has conventional reception sensitivity.

Where a user connects his or her terminal to a VoIP terminal adapter or the like, the user usually adjusts the signal transmission level, the minimum signal reception level, etc. for a transmission path to an accommodating station (exchange) in a manner other users do. However, the signal characteristics such as the attenuation amount vary depending on whether an IP network connected to the VoIP terminal adapter or a conventional PSTN network is provided between the accommodating station (exchange) and a partner terminal. Therefore, if the transmission level is increased so as to be suitable for, for example, a particular partner terminal having a very long analog transmission path, the level of a signal reaching a partner terminal over an IP network that is connected a VoIP terminal adaptor becomes so high as to cause such a problem as a transmission error of image information.

For example, as shown in FIG. 4, assume a case that there exist in mixture a first connection form in which a transmission-side facsimile machine 401 is connected to a VoIP-network-connected facsimile machine 408 via an analog transmission line 402, a PSTN network 403, an IP telephone network 404, an optical fiber 405, a terminal adapter (TA) 406, and an analog transmission line 407 and a second connection form in which the transmission-side facsimile machine 401 is connected to a PSTN-network-connected facsimile machine 410 via the analog transmission line 402, the PSTN network 403, and an analog transmission line 409.

In this case, as shown in FIG. 4, the first connection form and the second connection form are different from each other in the signal characteristics such as the attenuation amount and the echo. Therefore, if the transmission level is increased so as to be suitable for the second connection form, in the first connection form the level of a signal reaching the partner terminal is so high as to cause such trouble as a transmission error of image information or picking up of an echo signal returned from around the partner terminal.

Where a method is employed in which a communication is performed at an increased signal transmission level in redialing that is performed when a communication error has occurred, redialing is always necessary, as a result of which the communication fee is increased and frequent communication errors may cause users to feel anxious or render them distrustful.

In view of the above, in the embodiment, a modem transmission level and modem sensitivity (minimum reception level) which are communication control information corresponding to the connection form of each destination device is stored (registered) in advance in the destination information storage unit (registering unit) 103 so as to be correlated with an abbreviated dialing number (abbreviated number) corresponding to the destination device. If a modem transmission level and modem sensitivity are registered in the destination information storage unit 103 as corresponding to an abbreviated dialing number when a communication instruction with respect to the destination device is received, the modem (transmission/reception control unit) 123 is controlled based on those registered modem transmission level and modem sensitivity. The received communication instruction may be transmitted and received in the image communication apparatus 100, and be received from an external device. If neither a modem transmission level nor modem sensitivity is registered in the destination information storage unit 103 as corresponding to the abbreviated dialing number, the modem 123 is controlled according to a modem transmission level and modem sensitivity that are registered in advance in the apparatus 100.

FIG. 2 shows example correspondence between abbreviated dialing numbers, modem transmission levels, and modem sensitivity levels that are registered in the destination information storage unit 103 shown in FIG. 1.

Referring to FIG. 2, if the destination corresponding to an abbreviated dialing number "001" is, for example, the VoIP-network-connected facsimile machine 408 to which a connection is made in the first connection form shown in FIG. 4, the attenuation of a transmission/reception signal is small and the echo signal level is medium to high. In this case, a modem transmission level La and modem sensitivity Ga that are lower than ordinary levels are set and registered so as to be correlated with the abbreviated dialing number "001."

If the destination corresponding to an abbreviated dialing number "002" is, for example, the PSTN-network-connected facsimile machine 410, to which a connection is made in the second connection form shown in FIG. 4, the attenuation of a transmission/reception signal is medium to large and the echo signal level is low. In this case, a modem transmission level Lb and modem sensitivity Gb that are higher than the ordinary levels are set and registered so as to be correlated with the abbreviated dialing number "002."

As described above, as shown in FIG. 2, modem transmission levels La, Lb, Lc, . . . and modem sensitivity levels Ga, Gb, Gc, . . . that correspond to connection forms of destinations having abbreviated dialing numbers "001, "002," . . . are registered as corresponding to the abbreviated dialing numbers "001, "002," . . . , respectively.

Figure 3:
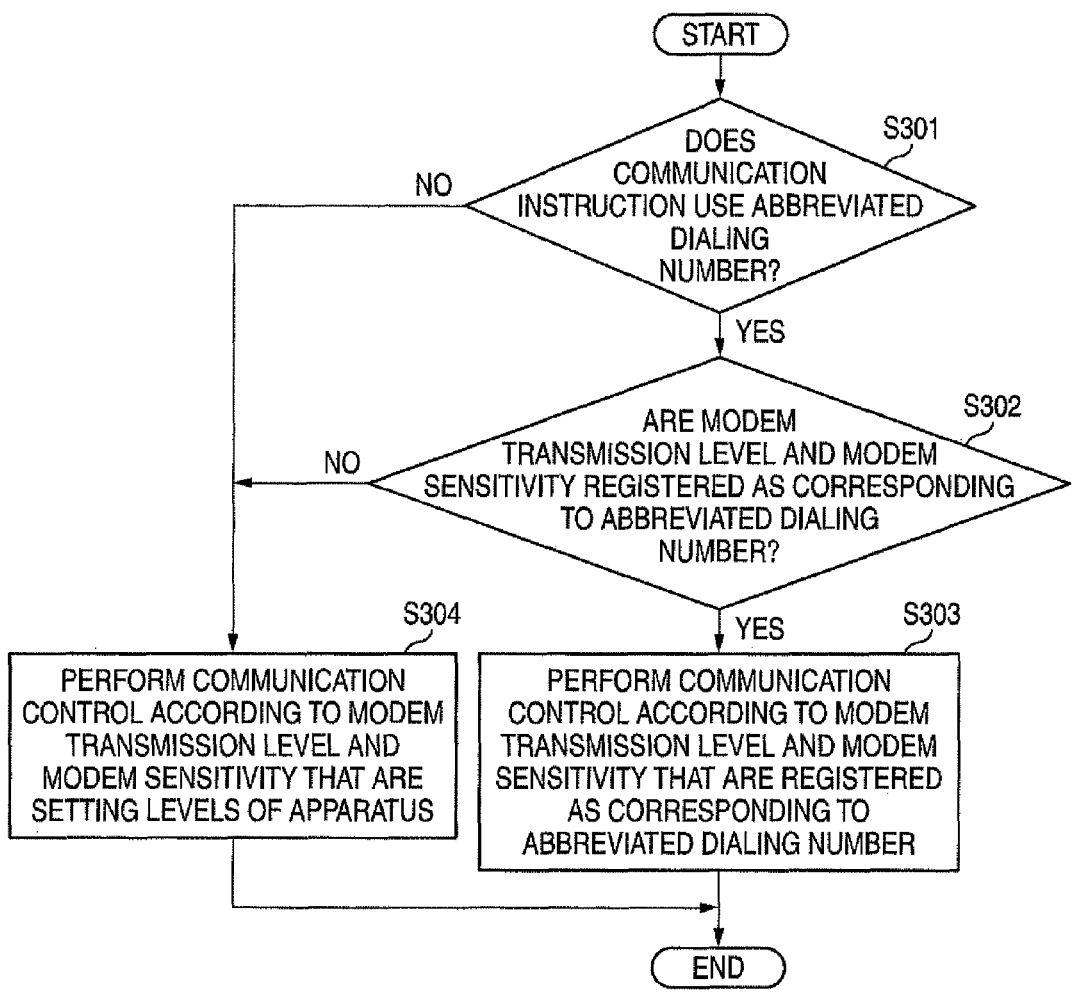
FIG. 3 is a flowchart of an example communication control of the image communication apparatus according to the embodiment.

FIG. 3 is a flowchart of an example communication control of the image communication apparatus 100 of FIG. 1 which uses the corresponding relationships between the abbreviated dialing numbers, modem transmission levels, and modem sensitivity levels shown in FIG. 2.

As shown in FIG. 3, upon a start of the process, first, it is checked at step S301 whether or not a communication instruction has been made using an abbreviated dialing number.

If it is judged that a communication instruction uses an abbreviated dialing number (S301: yes), a judge unit checks at step S302 whether or not a modem transmission level and modem sensitivity are registered in the destination information storage unit 103 shown in FIG. 1 as corresponding to the abbreviated dialing number of the communication instruction. If the judge unit judges that a modem transmission level and modem sensitivity are registered in the destination information storage unit 103 as corresponding to the abbreviated dialing number of the communication instruction (S302:

yes), the modem 123 is controlled based on the modem transmission level and the model sensitivity that are registered in the destination information storage unit 103 as corresponding to the abbreviated dialing number of the communication instruction. Then, the process is finished.

If the judge unit judges that a communication instruction does not use an abbreviated dialing number (S301: no) or if the judge unit judges that neither a modem transmission level nor modem sensitivity is registered in the destination information storage unit 103 as corresponding to the abbreviated dialing number of the communication instruction (S302: no), the process moves to step S304, where the modem 123 is controlled based on a modem transmission level and model sensitivity that are predetermined values set in the apparatus 100 in advance. Then, the process is finished.

The typical embodiment of the invention has been described above. However, the invention is not limited to the embodiment that has been described above with reference to the drawings and various modifications can be made as appropriate without departing from the spirit and scope of the invention.

For example, whereas in the embodiment a modem transmission level and modem sensitivity are registered in the destination information storage unit 102 shown in FIG. 1 so as to be correlated with each abbreviated dialing number (see FIG. 2), a modification is possible in which only one of a modem transmission level and modem sensitivity is registered so as to be correlated with each abbreviated dialing number and only one of a modem transmission level and modem sensitivity is used for controlling the modem 123.

Where the connection form of a destination device is known in advance, a modem transmission level and modem sensitivity may be registered in the destination information storage unit 102 shown in FIG. 1 so as to be correlated with a real dialing number instead of an abbreviated one. The modem 123 is controlled according to the thus-registered modem transmission level and the model sensitivity.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image communication apparatus comprising:
   a transmission control unit that controls an image information communication with a destination device which is another image communication apparatus based on an image information communication protocol;
   a network control unit that controls a network connection for a public network;
   a transmission/reception control unit that controls signal transmission and reception of the image information communication based on the image information communication controlled by the transmission control unit and the network connection controlled by the network control unit;
   a registering unit that registers pieces of communication control information with the transmission/reception control unit, the pieces of communication control information including a signal transmission power level and a minimum signal reception power level when communicating with the destination device, the signal transmission power level and the minimum signal reception power level being determined in consideration of an attenuation of a transmission/reception signal and an echo signal level;
   a judging unit that judges, when a communication instruction with respect to the destination device is received, whether the pieces of communication control information are registered with the registering unit as corresponding to the destination device; and
   a communication control unit that controls the transmission/reception control unit based on the pieces of communication control information if the judging unit judges that the pieces of communication control information are registered with the registering unit as corresponding to the destination device.

2. The image communication apparatus according to claim 1, wherein:
   the image information communication protocol includes a facsimile protocol,
   the transmission/reception control unit includes a modem,
   the transmission control unit controls the image information communication based on the facsimile protocol according to the ITU-T Recommendation T.30,
   the network control unit controls a network connection for an analog public network,
   the registering unit registers at least one of the signal transmission power level and the minimum signal reception power level of the modem as corresponding to an abbreviated number which identifies each destination device, and
   if the judging unit judges, when a communication instruction with respect to the abbreviated number is received, that at least one of the signal transmission power level and the minimum signal reception power level is registered with the registering unit as corresponding to the abbreviated number, the communication control unit controls the modem based on the registered at least one of the signal transmission power level and the minimum signal reception power level.

3. The image communication apparatus according to claim 2, wherein
   if the judging unit judges that neither the signal transmission level nor the minimum signal reception level is registered with the registering unit as corresponding to the abbreviated number, the communication control unit controls the modem based on a signal transmission level and a minimum signal reception level which are registered with the image communication apparatus in advance.

* * * * *